(12) United States Patent
Giordano et al.

(10) Patent No.: US 7,072,559 B2
(45) Date of Patent: Jul. 4, 2006

(54) MULTIPLE HINGED TRAY CABLE CONNECTING JOINT AND METHOD OF USING SAME

(75) Inventors: David A. Giordano, Barnegat, NJ (US); Maurice Kordahi, Atlantic Highlands, NJ (US); William Edmund Girzone, Saratoga Springs, NY (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 0 days.

(21) Appl. No.: 10/888,560

(22) Filed: Jul. 9, 2004

(65) Prior Publication Data

US 2006/0008230 A1    Jan. 12, 2006

(51) Int. Cl.
*G02B 6/00*    (2006.01)

(52) U.S. Cl. ........................ 385/135; 385/134; 385/137; 385/139

(58) Field of Classification Search ................ 385/134, 385/135, 136, 137, 139, 53, 100
See application file for complete search history.

(56) References Cited

U.S. PATENT DOCUMENTS

| | | | | |
|---|---|---|---|---|
| 4,911,521 A | * | 3/1990 | Ryuto et al. | 385/135 |
| 5,315,489 A | * | 5/1994 | McCall et al. | 361/801 |
| 5,323,480 A | * | 6/1994 | Mullaney et al. | 385/135 |
| 5,884,001 A | | 3/1999 | Cloud et al. | 385/135 |
| 6,275,641 B1 | * | 8/2001 | Daoud | 385/135 |
| 6,496,640 B1 | * | 12/2002 | Harvey et al. | 385/135 |

OTHER PUBLICATIONS

"All-Dielectric Self-Supporting (ADSS) Fiber Optic Cable", Fiberlign Hardware Applications, pp. 1-15, 1999.
Vintermyr, et al., "192-Fibre Count Submarine Cable For Repeaterless Systems", International Wire & Cable Symposium Proceedings, pp. 305-311, 1999.
Fiber Optic Catalog, Performed Line Products, Mar. 1999, table of contents and pp. 21 and 28.

* cited by examiner

*Primary Examiner*—Brian Healy
(74) *Attorney, Agent, or Firm*—Gross Tucker Perreault & Pfleger, PLLC

(57) ABSTRACT

A multiple hinged tray cable connecting joint includes a plurality of fiber trays pivotably coupled between sockets connected to fiber optic cables. The fiber trays can be positioned in a fiber loading position in which the fiber is spliced and coiled into the tray. The fiber trays can then be pivoted to a fiber storage position.

20 Claims, 6 Drawing Sheets

MULTIPLE HINGED TRAY CABLE CONNECTING JOINT AND METHOD OF USING SAME

TECHNICAL FIELD

The present invention relates to fiber optic cable connecting joints and more particularly, to a cable connecting joint having hinged fiber trays.

BACKGROUND INFORMATION

Fiber optic cables are deployed across long distances (e.g., many miles of ocean) to establish communication networks. Because these fiber optic cables cannot be made and deployed in infinite length, sections of the cables must be attached together to extend across large distances. Cable joints are used to connect the tails of fiber optic cables together, for example, when splicing the optical fibers within the cables.

Undersea fiber optic cable connecting joints are designed to transfer tension and torque between the strength members of the two cable tails being connected and to provide electrical continuity between the power conductors of the two cable tails. Cable connecting joints also provide optical continuity between the fiber optics of the two cable tails and provide storage of a length of the spliced fibers and the related splice splints. Undersea fiber optic cable joints can also be designed to perform these functions while withstanding cable installation and environmental conditions. For example, the connecting joints should withstand cable tensions, torques, shock and vibration associated with cable handling, deployment and recovery. The undersea connecting joints may also be designed to withstand hydrostatic pressures associated with deep-sea deployment, the corrosive salt-water environment, and the temperature fluctuations associated with manufacture, storage, installation and operation.

A typical undersea cable connecting joint includes a single fiber splice tray centered axially with the cable. The optical fibers are typically coiled on one side of this tray and the splice splints are mechanically held in place on this tray. One example of this type of Millennia Joint (MJ). Multiple tray cable connecting joints have only recently been developed for undersea fiber optic cable, although such connecting joints have existed in the terrestrial telecommunications industry for years. One example of an undersea multiple tray cable connecting joint is the URC-1 192 fiber joint box available from Alcatel Submarine Networks. In this type of multiple tray cable connecting joint, the trays are stacked against each other and the optical fiber can be loaded onto only one tray at a time.

Accordingly, there is a need for a multiple tray cable connecting joint that allows multiple trays to be loaded simultaneously from each side of the joint to facilitate the fiber splicing and coiling operation.

SUMMARY

In accordance with one aspect of the present invention, a cable connecting joint comprises first and second sockets adapted to connect to a cable and at least first and second fiber trays pivotably coupled between the sockets. The fiber trays pivot between a fiber loading position and a fiber storage position. A housing covers the sockets and the fiber trays.

According to another aspect of the present invention, a cable connecting joint assembly comprises first and second sockets adapted to connect to a cable, a shelf adapted to be coupled between the sockets, and at least one fiber tray adapted to be pivotably coupled between the sockets. The fiber tray is pivotable between a fiber loading position and a fiber storage position. A housing is adapted to cover the sockets, the shelf and the fiber tray.

According to a further aspect of the present invention, a method is provided for storing optical fiber in a cable connecting joint. The method comprises positioning at least first and second fiber trays in a fiber loading position in the cable connecting joint. The optical fiber is arranged in the first and second fiber trays. The first and second fiber trays are pivoted to a fiber storage position in the cable connecting joint. A housing is positioned over the fiber trays.

BRIEF DESCRIPTION OF THE DRAWINGS

These and other features and advantages of the present invention will be better understood by reading the following detailed description, taken together with the drawings wherein.

DETAILED DESCRIPTION

Figure 1:
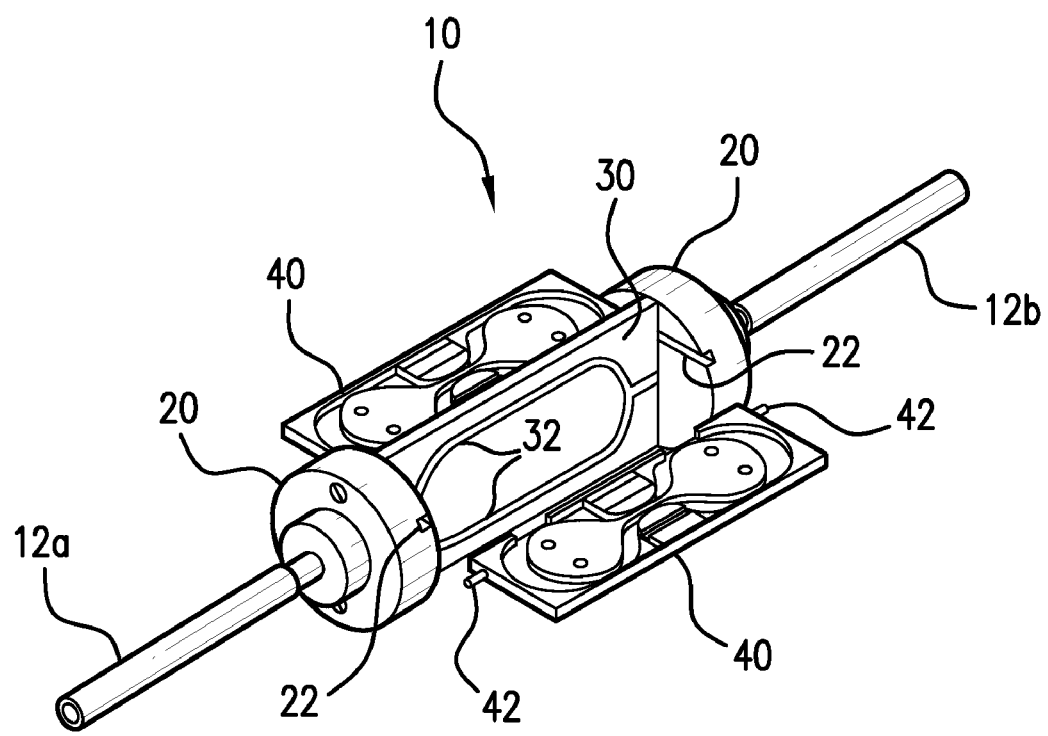
FIG. 1 is an exploded view of one embodiment of a cable connecting joint assembly, consistent with the present invention.

Referring to FIG. 1, a multiple hinged tray cable connecting joint 10 is shown between two fiber optic cables 12a, 12b. Although the exemplary embodiment of the multiple hinged tray cable connecting joint 10 is designed for use with an undersea fiber optic cable, the present invention can also be used with terrestrial cables.

According to one embodiment, the connecting joint 10 comprises first and second sockets 20 coupled to the respective cables 12a, 12b, a shelf 30 connected between the sockets 20, and fiber trays 40 pivotably coupled between the sockets 20. Each of the sockets 20 includes slots 22 for receiving pivot pins 42 on the fiber trays 40 to allow the fiber trays 40 to pivot within the connecting joint 10. The shelf 30 may include fiber-receiving grooves 32 for receiving the fibers as they pass from the cables 12a, 12b to the fiber trays 40. Although the exemplary embodiment shows the slots 22 and grooves 32 with a specific shape and configuration, those skilled in the art will recognize that the slots 22 and grooves 32 may take any shape or configuration.

The sockets 20 can be any structure or structures at the ends of a cable connecting joint used to connect to the cables. Although the exemplary embodiment shows the fiber trays 40 pivotably coupled directly to the sockets 20, the fiber trays 40 can also be pivotably coupled to other structures within a cable connecting joint. The sockets 20 may be coupled to the cables 12a, 12b and the shelf 30 may be connected to the sockets 20 in any way known to those skilled in the art. Although the exemplary embodiment includes the shelf 30, other embodiments of the multiple hinged tray cable connecting joint are contemplated without the shelf 30.

Figure 2:
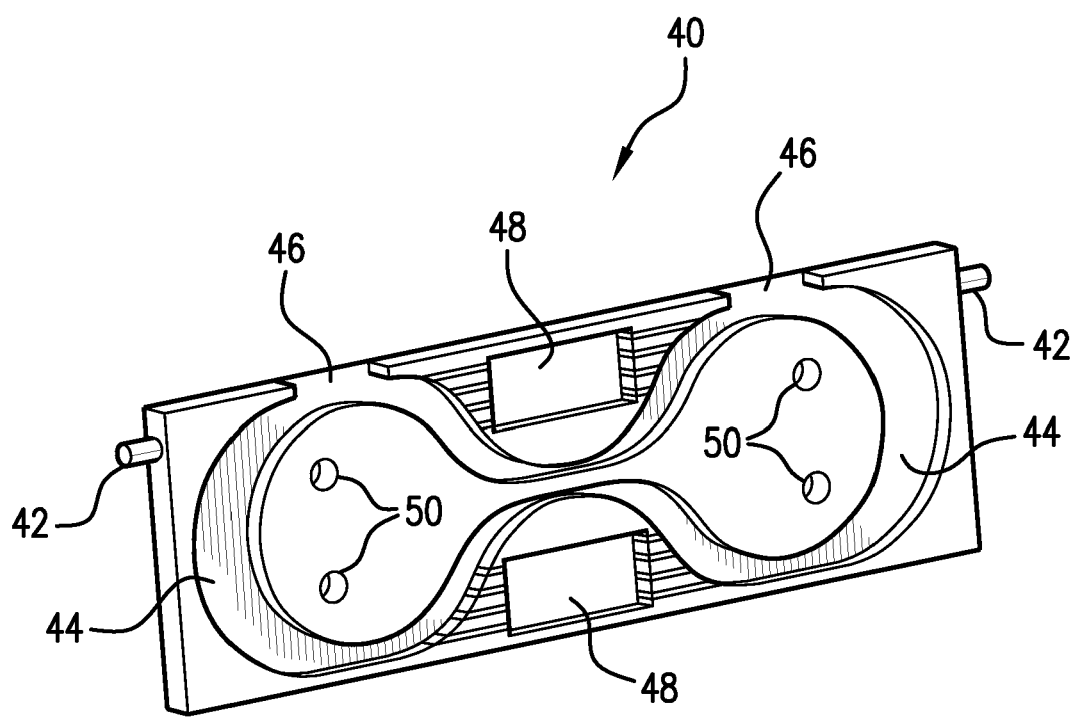
FIG. 2 is a perspective view of one embodiment of the fiber tray used in the cable connecting joint assembly.

One embodiment of the fiber tray 40 is shown in greater detail in FIG. 2. The fiber tray 40 includes fiber receiving channels 44 for receiving the coiled fibers (not shown) and passageways 46 for allowing the fibers to pass into and out of the channels 44. The fiber tray 40 also includes splice sections 48 for holding splice splints (not shown). Bolt holes 50 extend through the fiber tray 40 for receiving bolts (not shown) to secure the fiber trays 40 in the connecting joint 10. The fiber tray 40 may be made out of a plastic material such as delrin or a metal material such as steel, although any suitable material may be used.

Figure 3:
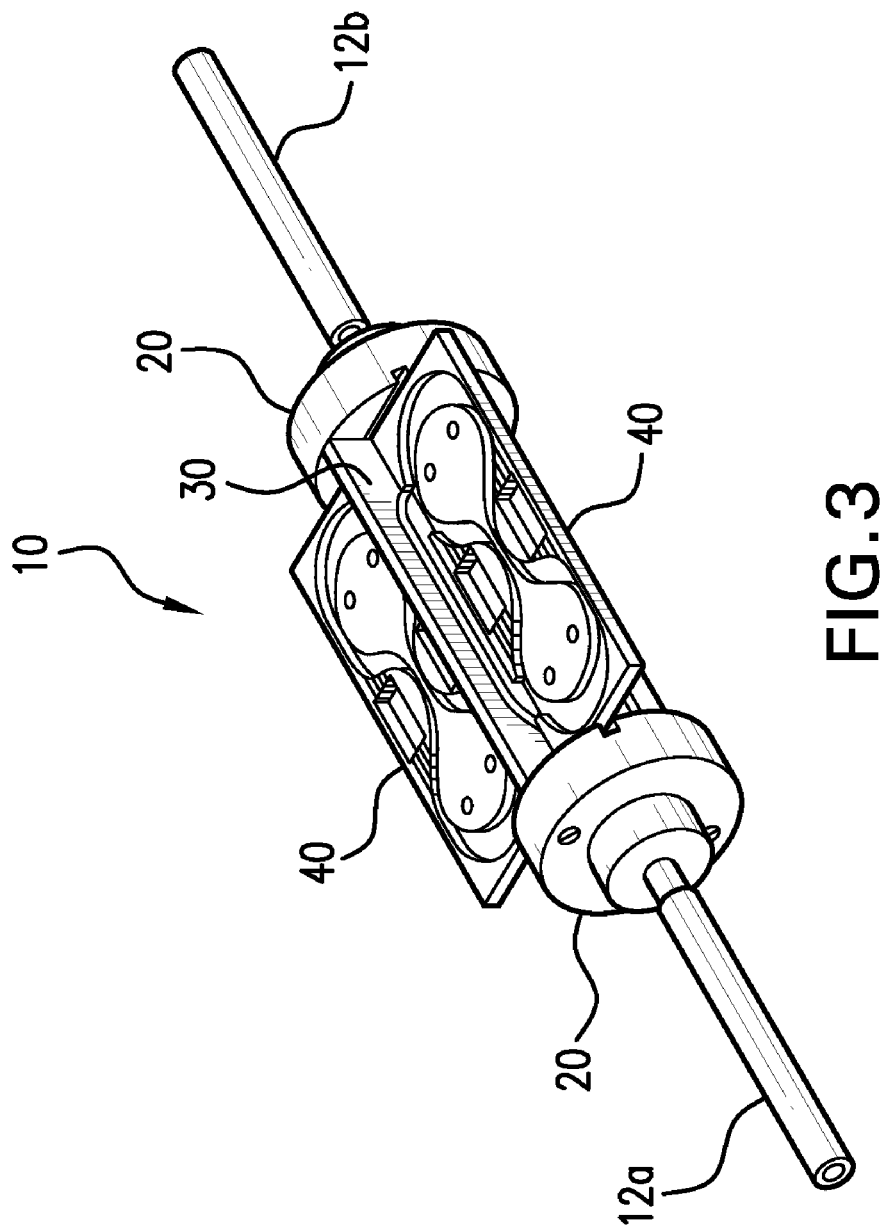
FIG. 3 is a perspective view of one embodiment of a cable connecting joint with two of the fiber trays in a fiber loading position, consistent with the present invention.
Figure 4:
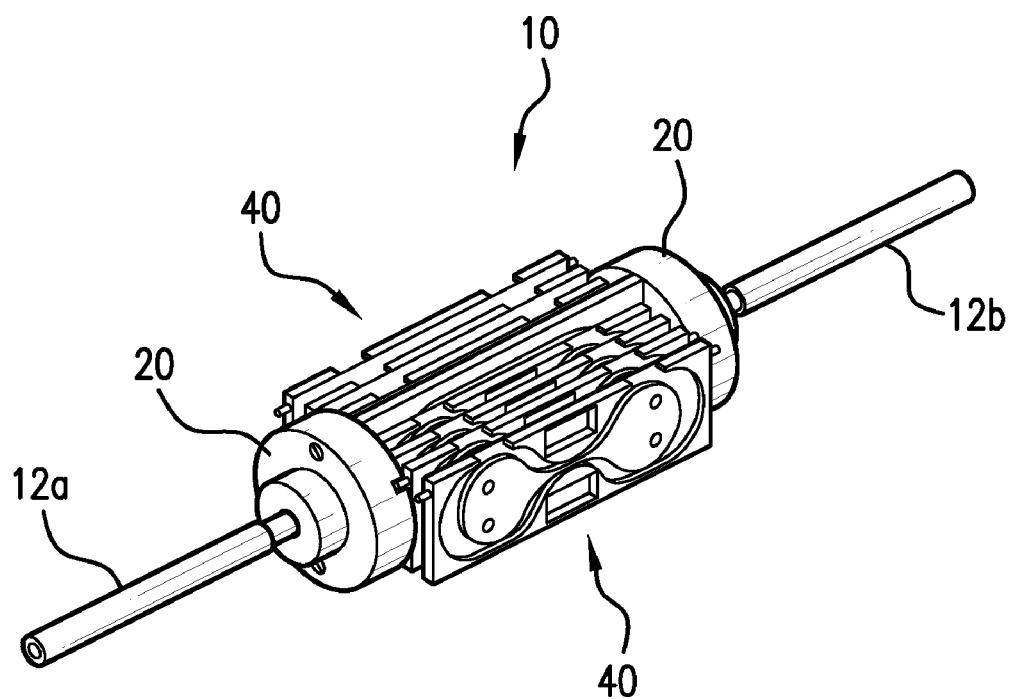
FIG. 4 is a perspective view of another embodiment of the cable connecting joint with multiple fiber trays in a fiber storage position, consistent with the present invention.
Figure 5:
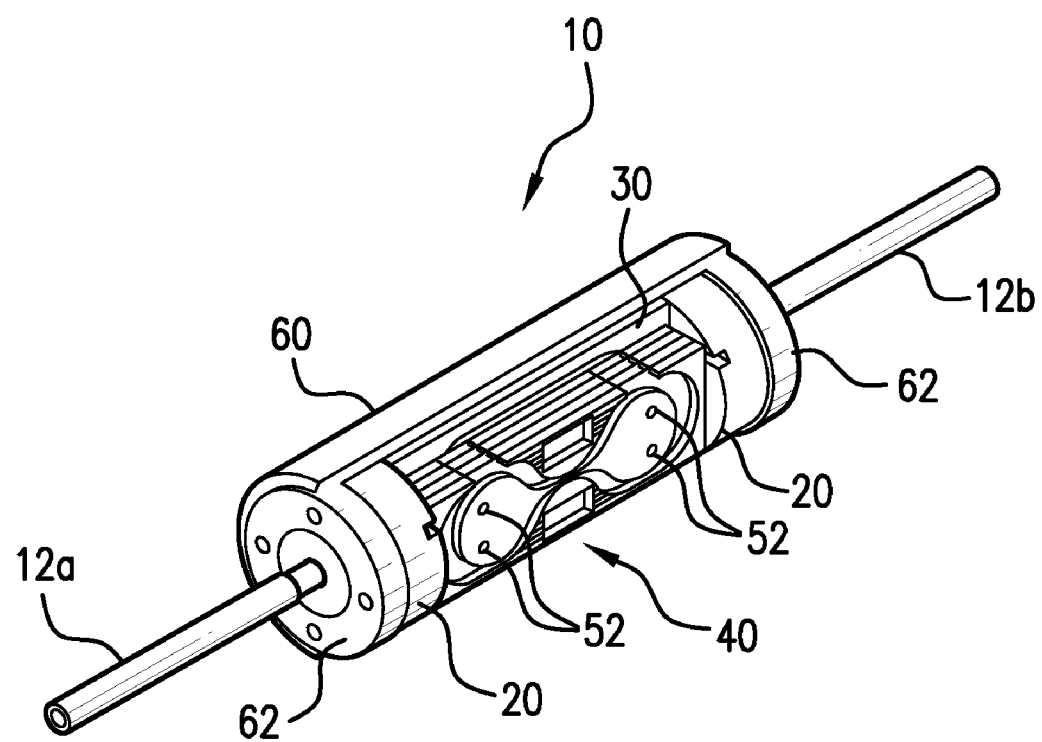
FIG. 5 is a partially cross-sectional perspective view of a further embodiment of the cable connecting joint covered with a housing, consistent with the present invention.

Referring to FIGS. 3–5, the assembly of the multiple hinged tray cable connecting joint 10 will be described in greater detail. The first two fiber trays 40 are positioned in a fiber loading position for splicing and coiling the first set of fibers (see FIG. 3). Having both fiber trays 40 in a loading position, allows operators to work simultaneously on both trays 40. The exemplary embodiment shows the fiber trays 40 generally horizontal and orthogonal to the shelf 30 in the fiber loading position, although other orientations are possible. The pivot pins 42 of the fiber trays 40 located in the slots 22 of the sockets 20 form a hinged connection allowing the fiber trays 40 to pivot with respect to the sockets 20.

Figure 3A:
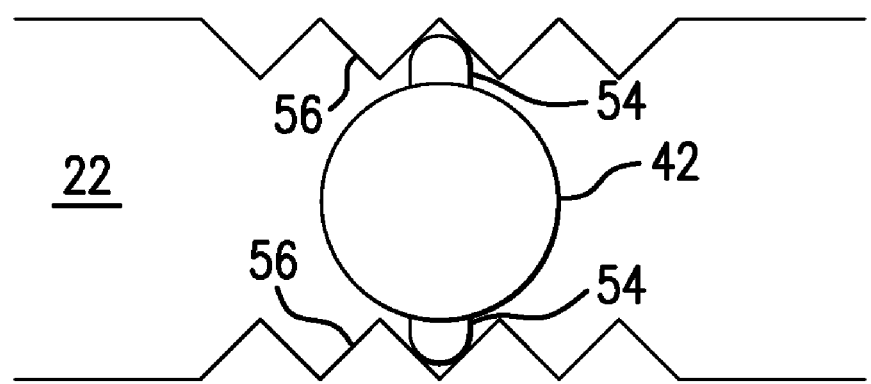
FIG. 3A is a side schematic view of one embodiment of the self-locking feature, consistent with the present invention.
Figure 3B:
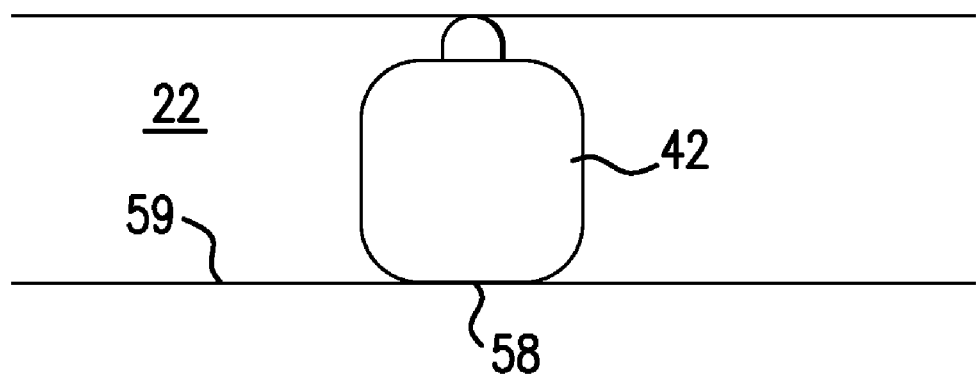
FIG. 3B is a side schematic view of another embodiment of the self-locking feature, consistent with the present invention.

A self-locking feature may be provided to hold the fiber trays 40 in the fiber loading position. In one exemplary embodiment shown in FIG. 3A, the self-locking feature may include spring-loaded mechanisms 54 extending from the pins 42 that engage one or more corresponding structures 56 (e.g., holes, grooves, ridges, teeth or recesses) in the slots 22. In another exemplary embodiment shown in FIG. 3B, the self-locking feature may also include one or more flat surfaces 58 on the pins 42 that engage(s) one or more flat surfaces 59 in the respective slots 22 to prevent rotation of the pins 42, thereby holding the trays in the loading position. Alternatively, the self-locking feature may be located on the tray 40. The self-locking feature may include any type of mechanism known to those skilled in the art that is capable of locking the trays 40 into the fiber loading position.

Other embodiments of the multiple hinged tray cable connecting joint 10 are contemplated in which more than two fiber trays can be loaded simultaneously. The sockets 20 may also include additional slots or paths (not shown), one for loading a tray and one for passage and/or temporary handling of a tray. The additional slots or paths may include slots parallel to the slots 22 and/or slots orthogonal to the slots 22. For example, a tray 40 may be moved to a loading position and locked in place in the slots 22 for loading and then moved to the additional slots after the tray has been loaded to allow another tray to be positioned in the slots 22 for loading.

After the splicing and coiling operations on the first two fiber trays 40 are completed, they are rotated at the hinged connection to the sockets 20 into a fiber storage position (see FIG. 4). The exemplary embodiment shows the fiber trays 40 generally vertical and parallel to the shelf 30 in the fiber storage position, although other orientations are possible. A second set of trays 40 can then be hinged to the sockets 20 by sliding the pivot pins 42 into the slots 22 and positioned in the fiber loading position. The splicing and coiling operation is begun on the second set of trays 40 for a different set of fibers. When completed, the second set of trays 40 are rotated at the hinged connections into the fiber storage position. This process is repeated until all of the trays 40 have been loaded and are pivoted into the fiber storage position (see FIG. 4).

The fiber trays 40 are then secured together and to the shelf 30 with bolts or locking fasteners 52 passing through the bolt holes 50 in the trays 40 (see FIG. 5). A pressure housing 60 can then be positioned over the sockets 20 and load rings 62 are tightened against the sockets 20, completing the joint closure. The pressure housing 60 and load rings 62 may be any type known to those skilled in the art, such as the type used on existing undersea fiber optic cable connecting joints. The housing 60 and load rings 62 may also be coupled to the sockets 20 in any way known to those skilled in the art. Alternatively, other types of housings and connections can be used, for example, in terrestrial environments.

Accordingly, the present invention facilitates the fiber coiling operation by allowing the splicing and coiling operation to be accomplished simultaneously from both sides of the connecting joint 10.

Modifications and substitutions by one of ordinary skill in the art are considered to be within the scope of the present invention, which is not to be limited except by the following claims.

The invention claimed is:

1. A cable connecting joint comprising:
   first and second sockets adapted to connect to a cable;
   at least first and second fiber trays pivotably coupled between said sockets, wherein said fiber trays pivot along longitudinal axes of said trays between a fiber loading position and a fiber storage position; and
   a housing covering said sockets and said fiber trays.

2. The cable connecting joint of claim 1 further comprising a shelf coupled between said sockets.

3. The cable connecting joint of claim 2 wherein said fiber trays are generally orthogonal to said shelf in said fiber loading position and generally parallel to said shelf in said fiber storage position.

4. The cable connecting joint of claim 1 further comprising first and second load rings tightened against said sockets.

5. The cable connecting joint of claim 2 further comprising a plurality of said fiber trays pivotably coupled to said sockets on each side of said shelf.

6. The cable connecting joint of claim 1 wherein each of said sockets includes at least one slot, wherein each side of said fiber trays includes at least one pivot pin engaging a respective said slot to form a hinged connection.

7. A cable connecting joint assembly comprising:
   first and second sockets adapted to connect to a cable;
   a shelf adapted to be coupled between said sockets;
   at least one fiber tray adapted to be pivotably coupled between said sockets, wherein said fiber tray is pivotable along a longitudinal axis of said fiber tray between a fiber loading position and a fiber storage position; and
   a housing adapted to cover said sockets, said shelf and said fiber tray.

8. The cable connecting joint assembly of claim 7 wherein each said fiber tray includes at least one pivot pin on each side for engaging respective said sockets.

9. The cable connecting joint assembly of claim 8 wherein each of said sockets includes a slot for receiving a respective said pivot pin on said fiber tray.

10. The cable connecting joint assembly of claim 7 further comprising first and second load rings for coupling said sockets to said housing.

11. The cable connecting joint assembly of claim 7 wherein said at least one fiber tray includes a plurality of fiber trays adapted to be pivotably coupled between said sockets on each side of said shelf.

12. A method of storing optical fiber in a cable connecting joint, said method comprising:
    obtaining said optical fiber from ends of first and second cables to be connected by said cable connecting joint;
    positioning at least first and second fiber trays in a fiber loading position in said cable connecting joint;
    arranging said optical fiber in said at least first and second fiber trays;
    pivoting said at least first and second fiber trays along longitudinal axes of said fiber trays to a fiber storage position in said cable connecting joint.

13. The method of claim 12 further comprising the step of positioning a housing over said at least first and second fiber trays.

14. The method of claim 12 wherein said at least first and second fiber trays are positioned between sockets in said cable connecting joint.

15. The method of claim 14 wherein said fiber loading position is generally orthogonal to a shelf between said sockets and said fiber storage position is generally parallel to said shelf.

16. The method of claim 15 further comprising the step of securing said at least first and second fiber trays to said shelf.

17. The method of claim 14 further comprising the step of tightening load rings against said sockets.

18. The method of claim 14 wherein the step of arranging said optical fiber includes coiling a plurality of sets of fiber in respective said fiber trays.

19. The method of claim 14 further comprising:
    after pivoting said at least first and second fiber trays to said fiber storage position, positioning additional fiber trays in said fiber loading position in said cable connecting joint;
    arranging said optical fiber in said additional fiber trays; and
    pivoting said additional fiber trays to said fiber storage position in said cable connecting joint.

20. The method of claim 19 further comprising securing all of said trays together in said fiber storage position.

\* \* \* \* \*